United States Patent
Kwon (10) Patent No.: US 9,531,650 B2
(45) Date of Patent: Dec. 27, 2016

(54) METHOD AND APPARATUS OF ISSUING EMAIL ACCOUNT

(71) Applicant: Samsung Electronics Co., Ltd, Suwon-si, Gyeonggi-do (KR)

(72) Inventor: Yong-won Kwon, Seoul (KR)

(73) Assignee: SAMSUNG ELECTRONICS CO., LTD., Suwon-Si (KR)

( * ) Notice: Subject to any disclaimer, the term of this patent is extended or adjusted under 35 U.S.C. 154(b) by 647 days.

(21) Appl. No.: 13/889,471

(22) Filed: May 8, 2013

(65) Prior Publication Data
US 2014/0089426 A1  Mar. 27, 2014

(30) Foreign Application Priority Data
Sep. 24, 2012  (KR) .......... 10-2012-0105950

(51) Int. Cl.
G06F 15/16 (2006.01)
H04L 12/58 (2006.01)
G06Q 10/10 (2012.01)

(52) U.S. Cl.
CPC ............. H04L 51/00 (2013.01); G06Q 10/107 (2013.01)

(58) Field of Classification Search
USPC .......................................... 709/206
See application file for complete search history.

(56) References Cited

U.S. PATENT DOCUMENTS

| 6,614,551 | B1  | 9/2003 | Peek |
| 8,095,606 | B1* | 1/2012 | Wiley ............... H04L 51/28  709/206 |
| 2002/0138581 | A1 | 9/2002 | MacIntosh et al. |
| 2008/0113679 | A1 | 5/2008 | Sung et al. |

OTHER PUBLICATIONS

European Search Report dated Dec. 10, 2013 issued in EP Application No. 13169002.6.
Patel S P et al.: "The Multimedia Fax-Mime Gateway", IEEE Multimedia, IEEE Service Center, New York, NY, vol. 1, No. 4, Dec. 21, 1994, pp. 64-70, XP000484152, ISSN: 1070-986X, DOI: 10.1109/93.338688.

* cited by examiner

*Primary Examiner* — Hee Soo Kim
(74) *Attorney, Agent, or Firm* — Staas & Halsey LLP (57) ABSTRACT

A method and apparatus for issuing an email account to a client device by a network device including an email server. The method includes: receiving an email from the client device via a first email account, which is registered in the email server before the email account of the client device is issued; reading information necessary for issuance of a new email account from the read email; and registering a second email account, which is to be issued to the client device, in the email server based on the read information.

21 Claims, 5 Drawing Sheets

METHOD AND APPARATUS OF ISSUING EMAIL ACCOUNT

CROSS-REFERENCE TO RELATED APPLICATIONS

This application claims the benefit of priority under 35 U.S.C. §119 from Korean Patent Application No. 10-2012-0105950, filed on Sep. 24, 2012, in the Korean Intellectual Property Office, the disclosure of which is incorporated herein in its entirety by reference.

BACKGROUND OF THE INVENTION

1. Field of the Invention

The present general inventive concept relates to a method and apparatus for issuing an email account to a client device by a network device including an email server in an environment where an email account is allocated to a device.

2. Description of the Related Art

Although email accounts are generally allocated to humans, as the number of devices connected to a network has recently increased, email accounts that are allocated to devices have likewise increased. Even though a protocol for sending/receiving data is not separately set as between devices to which email accounts are allocated, the devices still may easily exchange data by email. In particular, email is useful because of its rapid and inexpensive nature in exchanging data between devices that are located away from each other.

A typical example is the T. 37 fax standard established by the international telecommunication union (ITU). A T. 37 device according to a T. 37 standard attaches a scanned document in a TIFF-F image format to an email with a multipurpose internet mail extension (MIME) format. The T. 37 device may send the scanned document to another T. 37 device by email.

In order for a newly installed device to send/receive data by email, a user should create and register an email account of the device in an email server. Then, the user should set information regarding the email account and information regarding the email server in the device. However, this installation process is extremely inconvenient and cumbersome to general users having no prior knowledge.

SUMMARY OF THE INVENTION

The present general inventive concept provides a method and apparatus for issuing an email account of a client device by a network device including an email server and conveniently and effectively performing a process of setting the issued email account.

Additional features and utilities of the present general inventive concept will be set forth in part in the description which follows and, in part, will be obvious from the description, or may be learned by practice of the general inventive concept.

The foregoing and/or other features and utilities of the present general inventive concept may be achieved by providing a method of issuing an email account of a client device by a network device including an email server in an environment where a device has the email account, the method including: receiving an initial email from the client device via a first email account, which is registered in the email server, before the email account of the client device is issued; reading information necessary for issuance of a new email account from the initial email; and registering a second email account, which is to be issued to the client device, in the email server based on the read information.

The method may further comprise, before the receiving of the initial email, creating a preliminary email requesting the client device for information necessary for issuance of the email account, and sending the preliminary email to the client device via the first email account, wherein the preliminary email comprises at least one among an email account issuance policy of the network device, a network address of the email server, and an email account management policy to be set in the client device.

The foregoing and/or other features and utilities of the present general inventive concept may also be achieved by providing a non-transitory computer-readable recording medium having embodied thereon a computer program for executing the method.

The foregoing and/or other features and utilities of the present general inventive concept may also be achieved by providing a method of issuing an email account of a client device by a network device including an email server in an environment where a device has the email account, the method including: receiving an email from the network device via a first email account, in which identification is released, among email accounts registered in the email server; reading an email account issuance policy and a network address of the email server from the received email; determining an ID and a password of an email account, which is to be used by the client device, based on the read email account issuance policy; and sending an email requesting issuance of the second email account according to the determined ID and the password to the network address of the email server via the first email account.

The foregoing and/or other features and utilities of the present general inventive concept may also be achieved by providing a network device including an email server, the network device including: an account management unit configured to receive an email from a client device to which an email account is not issued via a first email account in which identification for sending/receiving an email is released, the account management unit further configured to read information necessary for issuance of a new email account from the received email; and an account creation unit for registering a second email account, which is to be issued to the client device, in the email server based on the read information.

The foregoing and/or other features and utilities of the present general inventive concept may also be achieved by providing a client device to which an email account is issued from a network device including an email server, the client device including: an email receiving unit configured to receive an email from the network device via a first email account, in which identification is released, among email accounts registered in the email server; a controller configured to read a network address of an email account issuance policy and a network address of the email server from the received email and determining an ID and a password of the email account, which is to be issued by the client device, based on the read email account issuance policy; and an email sending unit configured to send an email requesting issuance of the second email account according to the determined ID and the password to the network address of the email server via the first email account.

BRIEF DESCRIPTION OF THE DRAWINGS

The above and other features and advantages of the present general inventive concept will become more apparent by describing in detail exemplary embodiments thereof with reference to the attached drawings in which.

DETAILED DESCRIPTION OF THE EMBODIMENTS

Reference will now be made in detail to the embodiments of the present general inventive concept, examples of which are illustrated in the accompanying drawings, wherein like reference numerals refer to the like elements throughout. The embodiments are described below in order to explain the present general inventive concept while referring to the figures.

Figure 1:
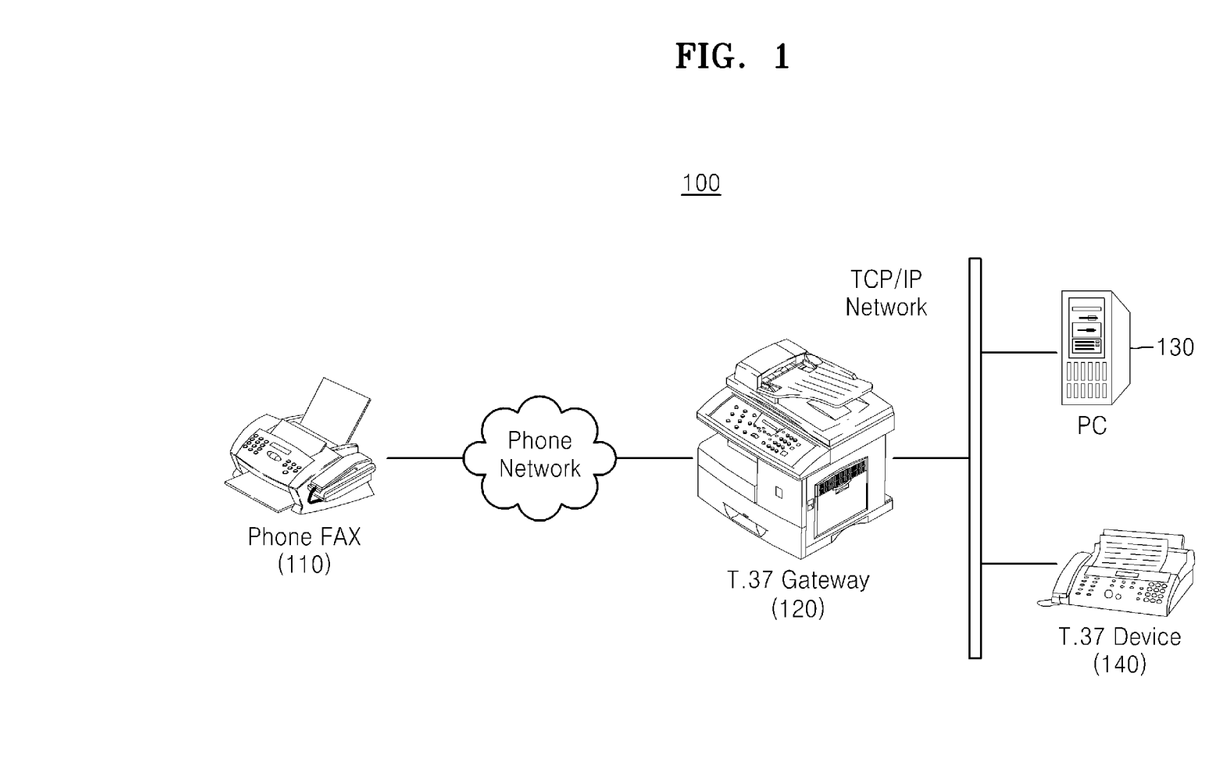
FIG. 1 is a view illustrating a configuration of an internet fax system according to the T.37 standard of the international telecommunication union (ITU), according to an exemplary embodiment of the present general inventive concept.

FIG. 1 illustrates a configuration of an internet fax system 100 according to the T.37 standard of the International Telecommunication Union (ITU), according to an embodiment of the present general inventive concept. Referring to FIG. 1, the internet fax system 100 includes a legacy telephone fax machine 110, a T.37 gateway 120, a PC 130, and a T.37 device 140.

Functions of sending/receiving an internet fax according to the T.37 standard may include a function of sending/receiving a document by email, a function of sending the document, which is received by email, by a telephone fax, a function of sending the document, which is received by the telephone fax machine, by email, and the like. Hereinafter, a device for sending, via a telephone fax machine, a document that was received by email is referred to as an off-ramp gateway. A device for sending, via email, a document that was received by a telephone fax machine is referred to as an on-ramp gateway. A gateway of the T.37 standard refers to a device that is connected to both a phone network and a TCP/IP network and supports exchanging of a document between a telephone fax machine and an email fax machine.

The legacy telephone fax machine 110 scans a document, sends the document via a phone network, and outputs a document received via the phone network. A user may use the legacy telephone fax machine 110 through a simple installation process and send documents by entering a phone number on the legacy telephone fax machine 110.

The T.37 gateway 120 includes an email server (not shown) that supports a plurality of accounts. In the email server of the T.37 gateway 120, email accounts are registered in the PC 130 and the T.37 device 140. The T.37 gateway 120 supports transmission by email between the PC 130 and the T.37 device 140. In other words, the T.37 gateway 120 may send an email fax received from the PC 130 to the T.37 device 140, or send an email fax received from the T.37 device 140 to the PC 130. Also, the T.37 gateway 120 serves as a gateway defined in the T.37 standard. In other words, the T.37 gateway 120 may convert a document received from the legacy telephone fax machine 110 into an attachment file of an email and send the attachment file to the PC 130 or the T.37 device 140, or convert an attachment file received from the PC 130 or the T.37 device 140 and send the converted attachment file to the legacy telephone fax machine 110.

The T.37 gateway 120 may further include a scan module (not shown) to scan a document or a printing module (not shown) to print an image. In this case, the T.37 gateway 120 may autonomously perform functions of both an internet fax machine and a telephone fax machine, as well as a function of a gateway.

The T.37 device 140 may receive an email account issued from the email server of the T.37 gateway 120. Also, the T.37 device 140 is required to input an address of the email server of the T.37 gateway 120 in order to send/receive an internet fax via the issued email account. The address of the email server of the T.37 gateway 120 may include, for example, an address of an SMTP server for sending an email, an address of a post office protocol 3 (POP3) server, or an internet messaging access protocol (IMAP) server for downloading the received email.

A program for sending/receiving an internet fax according to the T.37 standard may be installed in the PC 130. The PC 130 may perform the same function as the T.37 device 140 by using the installed internet fax program. A user may perform the above-described installation process of the T.37 device 140 by using the internet fax program installed on the PC 130.

The internet fax system 100 is an effective method that may reduce the cost of a traditional phone service use during a fax transmission. However, compared to the legacy telephone fax machine 110 on which only a phone number is entered, the internet fax involves a cumbersome process in that the T.37 gateway 120 must issue an email account, and that information regarding the email accounts issued by the T.37 device 140 and the PC 130, as well as information regarding the email server, all need to be entered.

The problems of the above-described internet fax system 100 may be resolved by the present general inventive concept. As described below, the T.37 gateway 120 may be replaced with a network device 200 shown in FIG. 2 or a client device 300 shown in FIG. 3, and a program for performing a method shown in FIG. 4 or 5 may be installed in the PC 130 so as to automatically perform issuance and setting of an email account. Hereinafter, it is assumed that the network device 200 includes email servers similar to the T.37 gateway 120, and the client device 300 serves as the T.37 device 140. This is just for convenience of description, and the scope of the present general inventive concept is not limited to an internet fax machine. The network device 200 or the client device 300 including the email server may be replaced with another network device. For example, the present general inventive concept may be used to issue email accounts to other devices, such as a smart TV, a desktop PC, a laptop computer, a tablet, a mobile device, an image forming apparatus, or a multifunction printer, any of which may include a network function. In addition, hereinafter, a second email account may be an account that is to be newly issued to the client device 300, and a first email account may be an email account registered in the network device 200 to issue a new email account. Although the first email account may require a password for identification, it is assumed that identification is released in the first email account.

Figure 2:
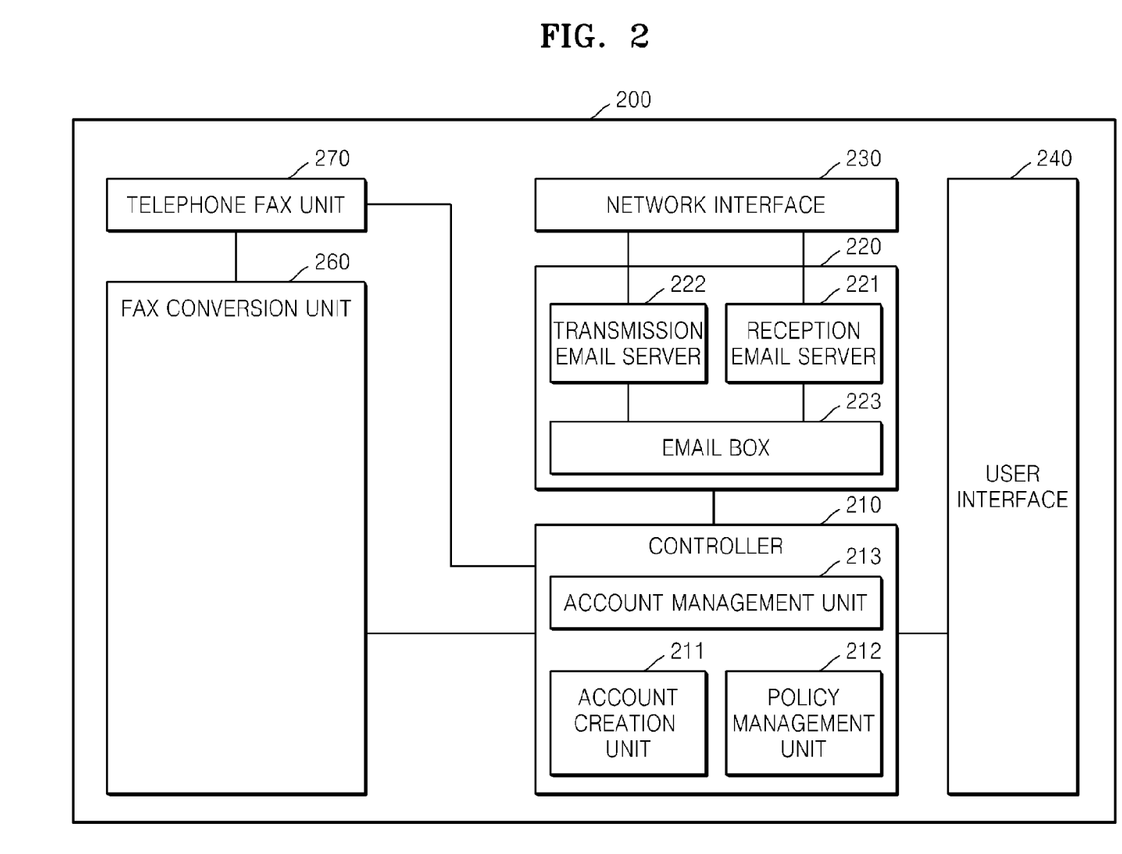
FIG. 2 is a block diagram of a network device according to an exemplary embodiment of the present general inventive concept.

FIG. 2 is a block diagram of the network device 200 according to an exemplary embodiment of the present general inventive concept. Referring to FIG. 2, the network device 200 includes a network interface 230, a user interface 240, an email server 220, a controller 210, a telephone fax unit 270, and a fax conversion unit 260.

The network interface 230 may be an interface to send/receive data via a wired/wireless network. For example, the network interface 230 may send and receive an email via a TCP/IP network.

The user interface 240 may receive an input of a user's manipulation and display a processing result of a predetermined operation to a user. For example, the user interface 240 may include a keypad or a touch input device to receive the input of the user's manipulation, or may include a connector to connect a human interface device (HID), such as a mouse or a keyboard. The user interface 240 may include a display device to display a processing result of an operation corresponding to the user's manipulation.

The user interface 240 may receive an email account issuance policy of the network device 200, an email account management policy of the client device 300, and device setting information of the client device 300 from a user, as described below. The user interface 240 may receive an input to create the first email account, which is a public account and in which identification is released, from a user. If an account creation unit 211 creates the first email account, the user interface 240 may display an ID of the first email account. Also, the user interface 240 may display a network address of the email server 220 together with the first email account. Here, the network address of the email server 220 may be an address and a port number of a transmission email server 222 or a reception email server 221. The address of the email server 220 will be described below.

The telephone fax unit 270 performs a communication function of a general telephone fax machine. In other words, the telephone fax unit 270 sends/receives an image to/from another telephone fax machine (not shown) via a phone network.

The fax conversion unit 260 converts a format of a fax. In other words, the fax conversion unit 260 converts a document received via the telephone fax unit 270 into an attachment file of an email and sends the attachment to the email server 220, or converts a format of an attachment file received by the email server 220 and sends the converted attachment file to the telephone fax unit 270. The fax conversion unit 260 converts a format of a document in order for the T.37 gateway to send a document received from the phone network to the TCP/IP network, or vice-versa.

The fax conversion unit 260 and the telephone fax unit 270 are components included when the present general inventive concept is used in a T.37 gateway. The fax conversion unit 260 and the telephone fax unit 270 may be omitted in other embodiments other than the T.37 gateway.

The email server 220 sends/receives an email, stores information regarding an email account, and stores the sent/received email. The email server 220 includes the transmission email server 222, the reception email server 221, and an email box 223.

The transmission email server 222 may be a server for sending/receiving an email to/from an external email server (not shown). The transmission email server 222 has a protocol for sending/receiving an email and may use, for example, a simple mail transfer protocol (SMTP) or other protocol. If a first client device 300 sends an email fax to a second client device (not shown), the first client device 300 should send the email via the transmission email server 222. The transmission email server 222 refers to a receiver's account of the email sent by the first client device 300 and sends the email to another external email server (not shown) corresponding to the receiver's account. Accordingly, the first client device 300 needs to have its own email account and know an address of the transmission email server 222 in order to send an email.

However, setting the address of the transmission email server 222 in a client device 300 may be perceived as a cumbersome and difficult operation for a user. As described below, according to the embodiment shown in FIG. 4 of the present general inventive concept, the address of the transmission email server 222 may be automatically set in a client device 300.

The reception email server 221 may be a server to support downloading of an email received by a predetermined email account. Hereinafter, it is assumed that an email account is issued to client device 300. If the external email server (not shown) sends an email to an email account of client device 300, the transmission email server 222 receives the email sent by the external email server (not shown) and stores the email in the email box 223. If client device 300 accesses its own email account, the reception email server 221 sends emails addressed to client device 300, which are stored in the email box 223, to client device 300. The reception email server 221 may use, for example, a POP3 or an IMAP to send an email to client device 300.

The transmission email server 222 and the reception email server 221 may have the same internet protocol (IP). In other words, since the transmission email server 222 and the reception email server 221 may be located in one network device 200, the transmission email server 222 and the reception email server 221 may have the same IP address. However, since the transmission email server 222 and the reception email server 221 can have different port values inside the network device 200, the transmission email server 222 and the reception email server 221 may be distinguished from each other.

In order to send/receive an email via the transmission email server 222 and the reception email server 221, identification of the transmission email server 222 and the reception email server 221 should be performed as a general rule. Identification of the transmission email server 222 and the reception email server 221 should be performed for security reasons, for example, in order to prevent use of the transmission email server 222 without permission and to thus prevent sending a large amount of junk mail to another external email server or to prevent unauthorized "sniffing" of someone else's email via the reception email server 221. Thus, an email may be sent/received via the transmission email server 222 and the reception email server 221 only when there are, for example, an SMTP account to verify authority to use the transmission email server 222, and a POP3 (or IMAP) account to verify authority to use the reception email server 221. IDs and passwords of the STMP account, the POP3 (or IMAP) account, and the email account may be set to have different values from one another. However, for convenience of description, hereinafter it is understood that if the email account is issued, the ID and the password are stored in the email box 223, and the stored ID and password are commonly used in the STMP account and the POP3 (or IMAP) account. At this time, an email address of the issued email account may be a 'stored ID@domain name'.

However, the transmission email server 222 or the reception email server 221 may operate an exception to allow sending/receiving of an email for a specific email account by using a non-identification method. As described below, even though identification of the transmission email server 222 or the reception email server 221 is not performed with respect to the first email account, sending/receiving an email via the first email account may be allowed. An address of the reception email server 221 may be displayed on the user interface 240, as described below with reference to FIG. 4. In the embodiment shown in FIG. 4, a client device 300 need only enter the ID of the first email account, in which identification is released, and the address of the reception email server 221, to initiate automatic performance of the remaining installation processes of the client device 300.

The email box 223 stores emails sent/received from/in the transmission email server 222 or the reception email server 221 and any attachments of the emails. The email box 223 stores emails received by the transmission email server 222 from any external email server and sends the emails to the reception email server 221. Then, the reception email server 221 sends the emails stored in the email box 223 to the client device 300. The email box 223 also stores information regarding the email account created by the account creation unit 211. For example, the email box 223 stores information regarding an ID and a password of the email account. The client device 300 may send and receive the email by using the ID and the password of the email account stored in the email box 223. Accordingly, storing the ID and the password of the email account in the email box 223 refers to issuing the email account.

The controller 210 controls operations of the telephone fax unit 270, the fax conversion unit 260, the network interface 230, the email server 220, and the user interface 240. A description of how the controller 210 controls the email server 220 to issue the email account for the client device 300 follows.

The controller 210 includes an account management unit 213, an account creation unit 211, and a policy management unit 212.

First, the account creation unit 211 creates an ID and/or a password of an email account for sending/receiving an email. For example, if a user requests creation of a new email account via the user interface 240, the account creation unit 211 creates an ID and a password of a new email account. The account creation unit 211 registers the created email account in the email box 223, thereby completing issuance of the new email account. The account creation unit 211 may refer to the email account issuance policy stored in the policy management unit 212 to create the email account. For example, the email account issuance policy may include a rule regarding creation of an ID and/or a password. In this case, if a user requests creation of an email account, even though the user does not input an ID and a password, the account creation unit 211 may create an ID and a password of the email account by automatically referring to the email account issuance policy and subsequently register the created ID and password in the email box 223. Alternatively, the account creation unit 211 may create an email account by using an ID and a password that are entered by a user instead of using the email account issuance policy.

The account creation unit 211 may create a first email account, which is a public account and through which identification for sending/receiving an email is released. Here, the first email account is an arbitrary account used only in a process of issuing the email account of the client device 300. After issuance of a second email account, i.e., the email account for the client device 300, is completed, the account management unit 213 may delete the first email account for security purposes. An ID of the first email account may be directly entered by a user via the user interface 240 as described above, or may be created according to the email account issuance policy of the policy management unit 212. The account creation unit 211 need not, however, create a password with respect to the first email account, which is a public use account. Accordingly, a user may access the first email account by using only an ID of the first email account.

Also, the account management unit 213 may allow the first email account to only be used for sending/receiving of an email for issuing an email account, and may prohibit use of the first email account for sending/receiving an email fax to/from the external email server. For example, if a user makes a request via client device 300 for creation of an email account, the account creation unit 211 refers to information regarding the first email account, which is a public use account in the email account issuance policy stored in the policy management unit 212. The account creation unit 211 creates an ID, e.g., "Reg", and stores the ID in the email box 223. In addition, the account creation unit 211 allows exchange of an email between the network device 200 and the client device 300 via the "Reg" account, and stores information showing that the account does not have authority to send an email to another external email server (not shown) or use the telephone fax unit 270 in the email box 223. The account management unit 213 allows the client device 300 to access the first email account without entering a password, and restricts sending of an email via the external email server or the telephone fax unit 270 with reference to the use authority stored in the email box 223.

The policy management unit 212 manages an email account issuance policy, an email account management policy, and device setting information regarding the client device 300. The policy management unit 212 provides the email account issuance policy for disclosure regarding creating the first email account by the request of the account creation unit 211. The email account issuance policy may include a rule to create an ID of the first email account, that is, the public use account. The policy management unit 212 provides the email account issuance policy for the client device 300 by the request of the account management unit 213. The email account issuance policy for the client device 300 may include an ID creation rule and a password creation rule. For example, the ID creation rule may regulate creation of an ID by 'combining a hostname and a present date' of the client device 300, and the password creation rule may regulate creation of a password by 'randomly combining a hostname and four numbers' of the client device 300.

The policy management unit 212 stores and manages an email account management policy to be set in the client device 300. The email account management policy may include a form of an email to be used by the client device 300 and rules to access and release rules for the email server 220. The policy management unit 212 may define a title of an email to be used in the email fax by the client device 300 and content of a body as the form of the email. For example, a title of an email to be sent for sending an internet fax by the client device 300 may be "IFAX from $hostname", and a body thereof may be "This is IFAX sent by $Hostname device." The rules to access and release rules for the email server 220 may include an access frequency for the email server 220, a time-out time, an update cycle of an email account, a number of times of re-access when an access error occurs, a T.37 DSN/MDN message notification response time out, and the like. Since the email account management policy stored in the policy management unit 212 is automatically set in the client device 300 as described below, a user need not manually set the email account management policy necessary for the client device 300.

The policy management unit 212 stores and manages device setting information to be applied to the client device 300. For example, if the client device 300 is a T.37 device, the policy management unit 212 stores a T.37 fax report output attribute value for an internet fax, both sides/single-sided printing setting, color/monochrome printing setting, and output paper setting. The device setting information stored in the policy management unit 212 may be automatically set in the client device 300 similar to the email account management policy.

The email account management policy and the device setting information that are stored in the policy management unit 212 may be entered or edited by a user via the user interface 240. In other words, the policy management unit 212 may provide a graphical user interface (GUI) for receiving the email account management policy and the device setting information via the user interface 240.

The account management unit 213 supports issuance of the second email account, which is an email account for the client device 300, via the first email account created by the account creation unit 211. In other words, the account management unit 213 sends/receives an email to/from the client device 300 via the first email account registered in the email server 220. If the account creation unit 211 registers the first email account in the email box 223, the account management unit 213 writes an email to be sent to the first email account. The account management unit 213 reads the email account issuance policy, the email account management policy, and the device setting information that are stored in the policy management unit 212. The account management unit 213 writes an email based on the read information. Table 1 shows an example of the information that may be included in the email written by the account management unit 213.

TABLE 1

| | |
|---|---|
| ID Creation Rule | hostname + Date |
| PW Creation Rule | hostname + number 4 digits |
| SMTP Server | smtp://192.168.10.1:25/ |
| POP3 Server | pop3://192.168.10.1:110/ |
| Message Title | IFAX from $Hostname |
| Message Body | This is IFAX sent by $Hostname device |
| Message Polling Time | 10 minutes |
| Message Printing Duples | On |
| Message Notification Response Time Out | 2 Days |

Referring to FIG. 1, an address of the transmission email server 222 is included in the email so that the client device 300 may send a reply email to the network device 200. The information shown in Table 1 is only an example for describing the email account issuance policy, the email account management policy, and the device setting information, and thus the scope of the present general inventive concept is not limited thereto.

The account management unit 213 sends an email including the information shown in Table 1 to the first email account. In other words, the account management unit 213 designates a receiver's email account as the first email account and sends an email via the SMTP server 222. The account management unit 213 may also designate a sender's email account as the first email account. Since the first email account is a public use email account, the network device 200 and the client device 300 may both commonly use the first email account. The network device 200 accesses the first email account to send an email to the first email account. At this time, the sender's email account and the receiver's email account are the same. Alternatively, the account management unit 213 may designate the sender's email account as a network device 200-specific email account instead of the first email account. For example, the network device 200 not only performs a function of the T.37 gateway, but also includes its own email account to perform a function of an internet fax machine. The network device 200 may therefore access its own email account and send an email to the first email account.

The email sent to the first email account by the account management unit 213 is sent to the client device 300 via the reception email server 221. In other words, the client device 300 accesses the reception email server 221 and downloads the email sent by the account management unit 213.

The account management unit 213 receives an email from the client device 300 via the first email account. In other words, the account management unit 213 receives a reply email for the email sent to the first email account. The client device 300 creates a reply email for the downloaded email. The client device 300 accesses the first email account and sends the reply email to the network device 200. In detail, the client device 300 sends an email, which is addressed via the transmission email server 222, to the network device 200. The sender's email account of the reply email is the first email account. The receiver's email account of the reply email may be the first email account or the network device 200-specific email account.

The account management unit 213 receives information necessary for issuance of a new email account from the reply email sent from the client device 300. The information necessary for issuance of a new email account includes an ID and a password of the email account. In other words, the client device 300 creates an ID and a password according to the email account issuance policy and sends the created ID and password to the network device 200 via the first email account. Accordingly, the account management unit 213 reads the ID and the password that are created according to the email account issuance policy.

The account management unit 213 determines whether the email received from the client device 300 includes the information necessary for issuance of the new email account. If the email does not include all of the information necessary for issuance of the new email account, an error message may be output via the user interface 240. Also, if the ID and the password that are included in the received email do not satisfy the email account issuance policy stored in the policy management unit 212, the account management unit 213 may output a corresponding error message via the user interface 240.

The account creation unit 211 registers the new email account in the email box 223 based on the information that is received by the account management unit 213 via the reply email from the client device 300. The account creation unit 211 registers the second email account, which is a client device 300-specific email account, in the email box 223 using the ID and the password included in the reply email from the client device 300.

The account creation unit 211 may send a push-type message notifying the registration of the second email account to the client device 300 via the reception email server 221. The push-type message may be sent to the client device 300 via the first email account or the second email account. The push-type message may include information regarding the ID or the password of the issued second email account. If issuance of the second email account is completed, the account management unit 213 may delete the first email account registered in the email box 223.

As described above, even though a user does not directly input the second email account, the network device 200 may automatically issue the second email account, which is an email account for the client device 300.

Figure 3:
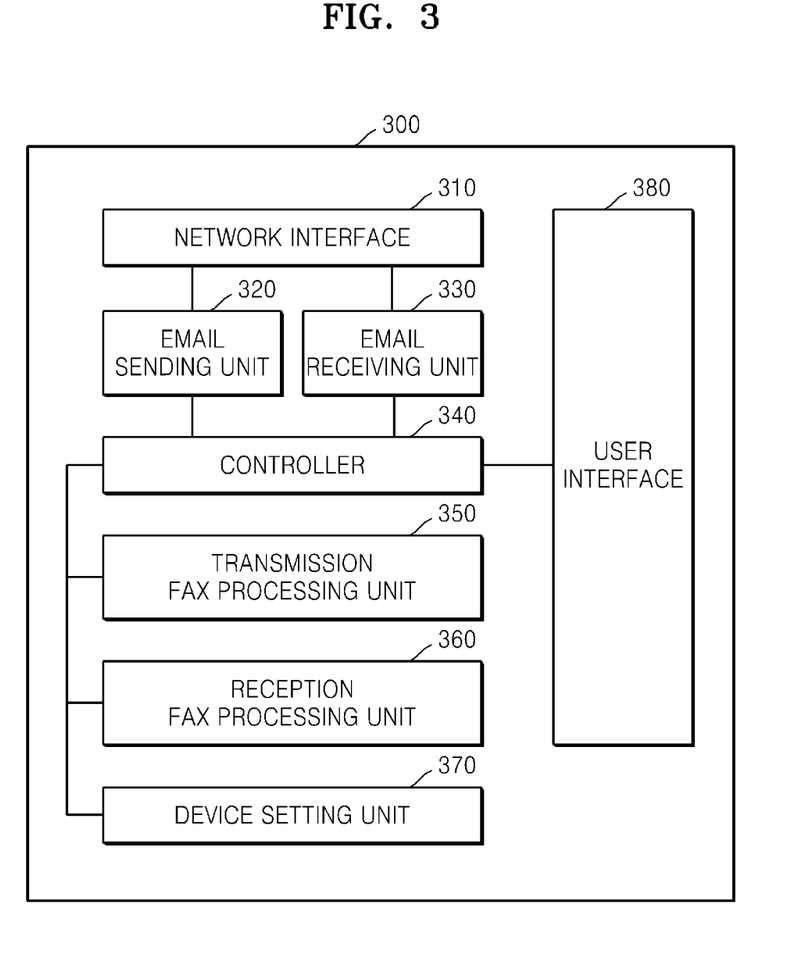
FIG. 3 is a block diagram of a client device according to an exemplary embodiment of the present general inventive concept.

FIG. 3 is a block diagram showing the client device 300 according to an exemplary embodiment of the present general inventive concept. A repeated description with regard to the above-described embodiment will be omitted, and thus the embodiment shown in FIG. 3 will be described with reference to the description with regard to FIGS. 1 and 2.

Referring to FIG. 3, the client device 300 includes a network interface 310, an email sending unit 320, an email receiving unit 330, a controller 340, a transmission fax processing unit 350, a reception fax processing unit 360, a device setting unit 370, and a user interface 380.

The network interface 310 provides an interface via which the client device 300 may access a TCP/IP network. The network interface 310 is a component corresponding to the network interface 230 of the network device 200.

The user interface 380 is a component corresponding to the user interface 240 of the network device 200. The user interface 380 receives an input of a user's manipulation and displays a processing result of a predetermined operation to a user. The client device 300 may receive an entry of an address of the email server 220 of the network device 200 from a user via the user interface 380, and an entry of an ID of the first email account. Here, the address of the email server 220 refers to an address of the reception email server 221 and/or an address of the transmission email server 222.

The transmission fax processing unit 350 writes an email in order for the client device 300 to send an internet fax. The transmission fax processing unit 350 may include a scanning module (not shown) for scanning a document. The transmission fax processing unit 350 creates an email to which an image file of the scanned document is attached. The transmission fax processing unit 350 then sends the email via the email sending unit 320.

The reception fax processing unit 360 processes any internet fax received by the client device 300. The email receiving unit 330 sends an email, which is received according to instructions of the controller 340, to the reception fax processing unit 360. The reception fax processing unit 360 extracts an image of an attached document from an email. When the extracted image file is encoded, the reception fax processing unit 360 decodes the image file and converts the image file into a printable format. The reception fax processing unit 360 may include a print module (not shown) for printing the image file, and the decoded image file is printed via the print module.

The transmission fax processing unit 350 and the reception fax processing unit 360 are components included when the client device 300 is a T.37 device. Accordingly, when the present general inventive concept is used in a device other than an internet fax machine, for example, a smart TV or a PC, the transmission fax processing unit 350 and the reception fax processing unit 360 may be omitted from the client device 300.

The device setting unit 370 sets attribute values for operations of the client device 300. Here, the attribute values refer to the address of the email server 220, a management policy of the second email account, the device setting information of the client device 300, and the like. The device setting unit 370 may set the address of the reception email server 221 or the transmission email server 222 of the network device 200 that is entered via the user interface 380. Also, the device setting unit 370, as described below, receives an input of the management policy or the device setting information of the email account that is read by the controller 340 and sets the received management policy or device setting information in the client device 300. Examples of the email account management policy or the device setting information have been described above with reference to FIG. 2.

The email sending unit 320 sends an email to the transmission email server 222 of the network device 200. When the transmission email server 222 uses an SMTP protocol, the email sending unit 320 may be an SMTP client of the transmission email server 222. The email sending unit 320 may send an email to the address of the transmission email server 222 via the SMTP protocol. As described below, the email sending unit 320 sends an email to the transmission email server 222 via the first email account requesting issuance of the second email account according to an ID and a password determined by the controller 340.

The email receiving unit 330 downloads an email from the reception email server 221 of the network device 200. When the reception email server 221 uses a POP3 or IMAP protocol, the email receiving unit 330 may be a POP3 or IMAP client of the reception email server 221. The email receiving unit 330 accesses the address of the reception email server 221 and downloads the received email to a predetermined email account in the client device 300 by using the POP3 or IMAP protocol. For example, the email receiving unit 330 downloads the email, which is sent to the first email account by the network device 200, from the reception email server 221. Since a password is not set in the first email account, the email receiving unit 330 may download the received email to the first email account by using only the address of the reception email server 221 and the ID of the first email account. As described above, a user may input the address of the reception email server 221 and the ID of the first email account to the client device 300 via the user interface 380.

The controller 340 reads the email account issuance policy and the address of the email server 220 of the network device 200 from the email received via the first email account. For example, when the email receiving unit 330 receives the email including the information shown in Table 1, the controller 340 reads the ID creation rule, the password creation rule, and the address of the SMTP Server from Table 1. The controller 340 determines an ID and a password of an email account, which are to be used by the client device 300, according to the ID creation rule and the password creation rule. For example, when a hostname of the client device 300 is "IFAX 1," the controller 340 may determine the ID of the email account to be "IFAX120120905" by combining "IFAX 1" and the present date, for example, "2012.09.05." The password of the email account may be determined in a similar way. The ID creation rule and the password creation rule are exemplary, and thus the ID creation rule and the password creation rule may vary as necessary, for example, a case using a predetermined character string that is entered by a user, a case using an IP address, or a case of using a phone number of a telephone fax machine. The device setting unit 370 may set an ID and a password of a basic email account, which are to be used by the client device 300, based on the ID and the password that are determined by the controller 340.

The controller 340 may read the email account management policy or the device setting information from the email that is received via the first email account. At this time, the device setting unit 370 sets attribute values of the client device 300 based on the email account management policy or the device setting information. For example, the device setting unit 370 sets a form of an email to be used by the client device 300 and access and release rules for the second email account. Examples of the email account management policy and the device setting information have been described above with reference to FIG. 2.

The controller 340 creates an email based on the determined ID and password. For example, the controller 340 creates an email including information of "ID: IFAX120120905" and "PW: IFAX11234." Both a sender's email account and a receiver's email account of the email may be the first email account. Or, for example, the sender's email account may be the first email account, and the receiver's email account may be a network device 200-specific email account. The controller 340 requests the email sending unit 320 to send the email, which is created via the first email account, to the transmission email server 222 of the network device 200.

As described above with reference to FIG. 2, the network device 200 registers the second email account in the email server 220 based on the email sent by the client device 300. If the network device 200 sends a message notifying that registration of the second email account has been completed, the email receiving unit 330 receives the notification message. Accordingly, the issuance of the second email account of the client device 300 is completed, and the client device 300 may send/receive an email via the second email account.

In the above description, a case where the network device 200 of FIG. 2 serves as the T.37 gateway and the client device 300 of FIG. 3 serves as the T.37 device has been described. However, the network device 200 and the client device 300 may be replaced with other types of electrical equipment. Also, the network device 200 and the client device 300 may be configured as, for example, an image forming apparatus or a multifunction printer (MFP). When the network device 200 and the client device 300 are configured as an image forming apparatus or an MFP, the network device 200 and the client device 300 may perform printing, scanning, and copying functions, and may further perform a web browser function for accessing a web browser. Also, the controller 210 shown in FIG. 2 may be formed not only in a T.37 gateway, but also in a T.37 device. In addition, the controller 210 may be formed in a network router including a T.37 on-ramp or T.37 off-ramp function.

Figure 4:
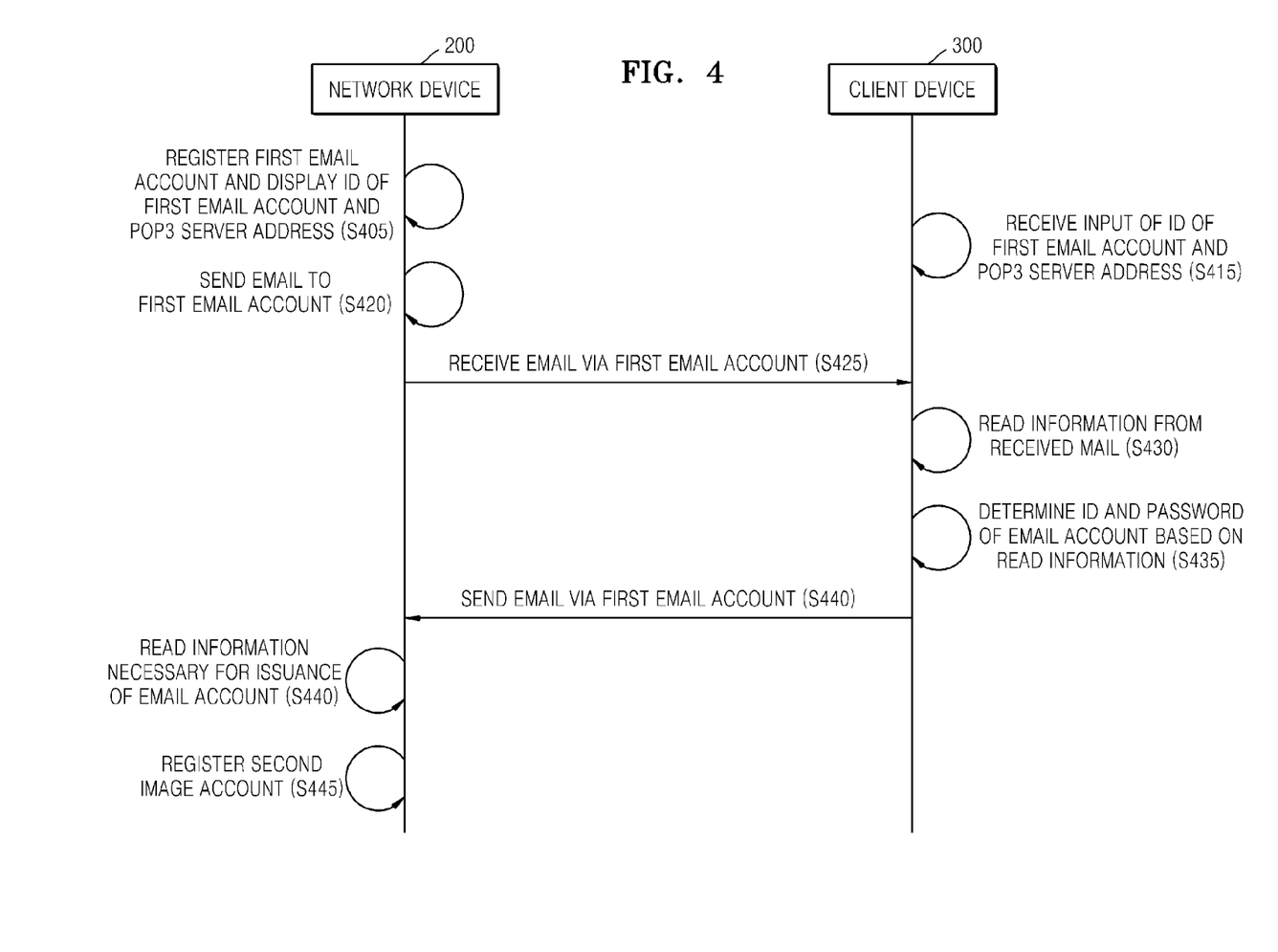
FIG. 4 is a flowchart illustrating a method of issuing an email account, according to an exemplary embodiment of the present general inventive concept.

FIG. 4 is a flowchart showing a method of issuing an email account, according to an exemplary embodiment of the present general inventive concept. In the embodiment shown in FIG. 4, it is assumed that a network setting, such as IP addresses of the network device 200 and the client device 300, has been completed. In order for an email server of the network device 200 to receive an email from another email server, IP addresses corresponding to a domain name and a hostname of the network device 200 need to be registered in a DNS server (not shown). For example, it is assumed that the network device 200 has a hostname 'A' and a domain name 'test.com', and that the email server of the network device 200 has an email account 'reg.' As such, in order for the network device 200 to send/receive an email to/from another email server via 'reg@test.com,' an IP address corresponding to 'A.test.com' needs to be registered as a host record in the DNS server. Also, as an address of an email server for a domain 'test.com,' 'A.test.com' needs to be registered as an MX Record in the DNS server. Accordingly, another email server may search for the address 'A.test.com' with reference to the MX record for the domain 'test.com' and search for an IP address corresponding to the domain 'A.test.com' with reference to the host record and thus may send an email to the 'reg@test.com'. Hereinafter, it is assumed that an operation of setting values of the MX Record and the host record in the DNS server (not shown) has been completed in order for the network device 200 to operate as an email server. Also, it is assumed that inputting an address of the DNS server in the client device 300 has been completed and that the client device 300 is allocated an IP address. In addition, the embodiment shown in FIG. 4 may be described with reference to FIGS. 1 to 3.

First, the network device 200 registers the first email account and displays the ID of the first email account and the address of the reception email server 221 (operation S405). The network device 200 registers the first email account, which is a public use account and in which identification is released, in the email server 220. Then, the network device 200 displays the ID of the first email account and the address of the reception email server 221.

The client device 300 receives an input of the ID of the first email account and the address of the reception email server 221 (operation S415). A user of the client device 300 may enter the ID of the first email account and the address of the reception email server 221 in the client device 300. If the entry of the ID of the first email account and the address of the reception email server 221 is completed, the client device 300 may send/receive an email to/from the network device 200 via the first email account.

The network device 200 sends a first email including an email account issuance policy to the first email account (operation S420). The first email may further include the address of the transmission email server 222 and the email account management policy, which is to be set in the client device 300, together with the email account issuance policy.

The client device 300 downloads the first email sent to the first email account from the reception email server 221 (operation S425). In other words, the client device 300 downloads the first email by using, for example, a POP3 or IMAP protocol.

The client device 300 reads the email account issuance policy from the downloaded first email (operation S430). The client device 300 may also read the address of the transmission email server 222 and the email account management policy, which is to be set in the client device 300, as well as the email account issuance policy.

The client device 300 determines the ID and the password of the second email account, which is to be used by the client device 300, based on the read email account issuance policy (operation S435). The client device 300 may set the basic email account of the client device 300 based on the ID and the password of the second email account. Also, the client device 300 may set the address of the transmission email server 222 and the email account management policy in the client device 300.

The client device 300 sends a second email including the ID and the password of the second email account (operation S440). The client device 300 creates the second email based on the determined ID and password of the second email account. The second email is sent to the address of the transmission email server 222, and a sender's email account of the second email may be the first email account. A receiver's email account of the second email may be the first email account or the network device 200-specific email account.

The network device 200 receives the second email sent by the client device 300 and reads information necessary for issuance of a new email account from the second email (operation S440). The network device 200 reads the ID and the password of the second email account from the second email.

The network device 200 registers the read ID and password of the second email account in the email server 220 and thus completes issuance of the second email account of the client device 300 (operation S445). The network device 200 may send a message to the client device 300 notifying that the issuance of the second email account has been completed. The message may include information regarding the ID and the password of the second email account.

Figure 5:
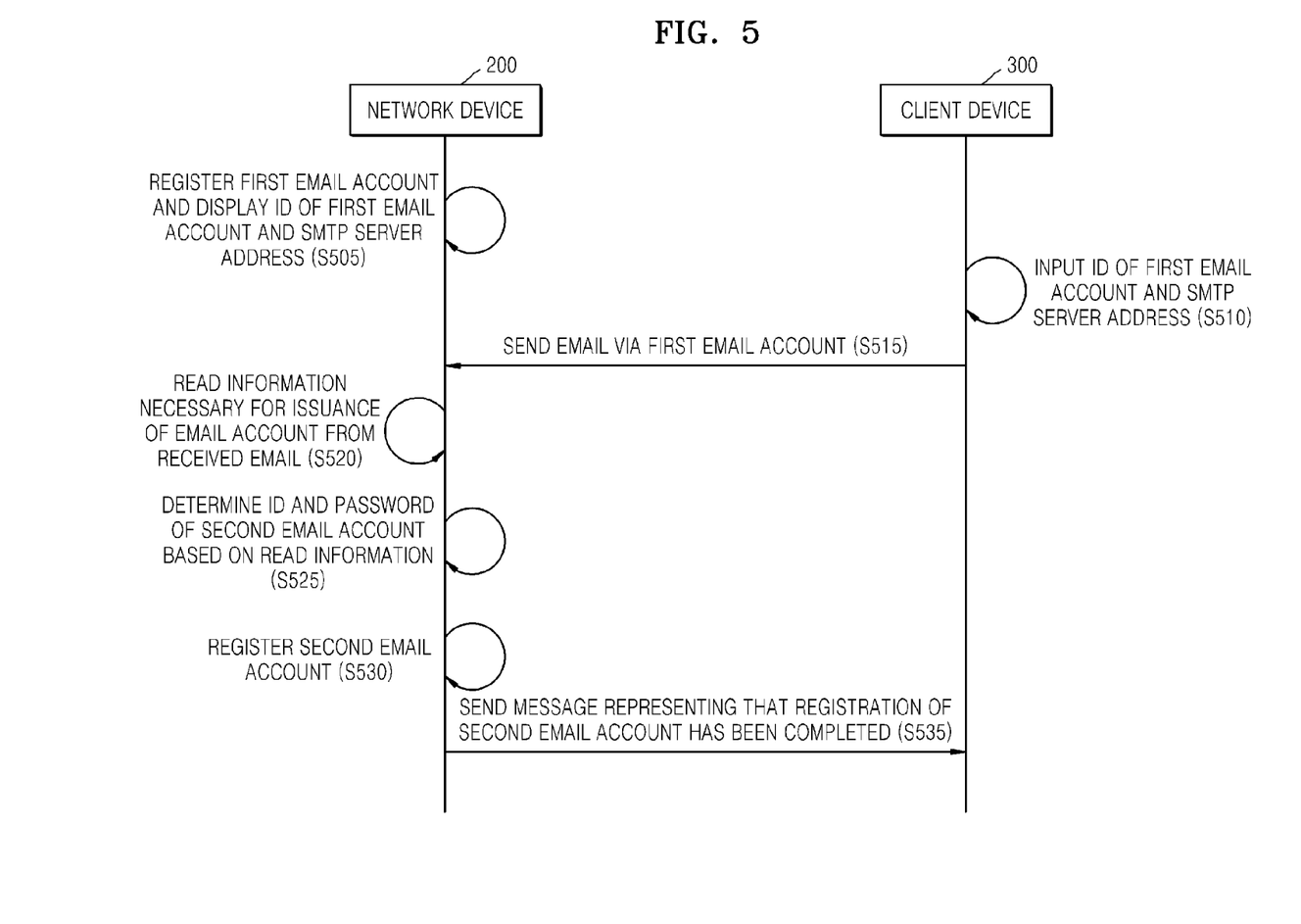
FIG. 5 is a flowchart illustrating a method of issuing an email account, according to another exemplary embodiment of the present general inventive concept.

FIG. 5 is a flowchart showing a method of issuing an email account, according to another exemplary embodiment of the present general inventive concept. In the embodiment shown in FIG. 5, a repeated description with regard to the embodiments shown in FIGS. 1 to 4 will be omitted, and thus only differences between the embodiment shown in FIG. 5 and the embodiments shown in FIGS. 1 to 4 will be described below.

First, the network device 200 registers the first email account and displays the ID of the first email account and the address of the transmission email server 222 (operation S505). Regarding the differences between the embodiment shown in FIG. 5 and the embodiments shown in FIGS. 1 to 4, although the address of the reception email server 221 is displayed in operation S405, the address of the transmission email server 222 is displayed in operation S505. Alternatively, both the addresses of the reception email server 221 and the transmission email server 222 may be simultaneously displayed in operation S405 or S505.

The client device 300 receives inputs of the ID of the first email account and the address of the transmission email server 222 (operation S510).

The client device 300 sends an email requesting issuance of a new email account via the first email account (operation S515). The email includes information for identifying the client device 300. For example, the email may include a hostname of the client device 300, an IP address, a MAC address, and a predetermined character string that is input by a user. The email may further include a password of the second email account, which is entered by a user. The client device 300 creates the email and sends it to the address of the transmission email server 222 of the network device 200. Both a sender's email account and a receiver's email account of the email may be the first email account.

The network device 200 receives the email sent by the client device 300 via the first email account and reads information necessary for issuance of a new email account (operation S520). Here, the information necessary for issuance of a new email account may include, for example, a hostname used to identify the client device 300, an IP address, a MAC address, and a predetermined character string that is input by a user. When the email includes a password, the password may be read at the same time when the information is read.

The network device 200 determines the ID and the password of the second email account based on the read information (operation S525). Referring to FIG. 2, the network device 200 determines the ID and the password of the second email account with reference to the email account issuance policy stored in the policy management unit 212 and identification information of the client device 300. The character string included in the email sent by the client device 300 may be determined to be the ID of the second email account. When the email includes a password, determination of the password may be omitted.

The network device 200 registers the ID and the password of the second email account in the email server 220 and thus completes issuance of the second email account (operation S530).

The network device 200 sends a message to the client device 300 notifying that the issuance of the second email account has been completed (operation S535). The message may include the ID and the password of the second email account.

According to one or more embodiments of the present general inventive concept, a process of issuing an email account by inputting an ID and a password to a network device including an email server and a process of inputting information regarding the email server and information regarding the issued email account to a client device may be automatically performed, thereby improving user convenience.

The present general inventive concept can also be embodied as computer-readable codes on a computer-readable recording medium. The computer-readable recording medium is any data storage device that can store data which can be thereafter read by a computer system. Examples of the computer-readable recording medium include read-only memory (ROM), random-access memory (RAM), CD-ROMs, magnetic tapes, floppy disks, optical data storage devices, etc. The computer-readable recording medium can also be distributed over network-coupled computer systems so that the computer-readable code is stored and executed in a distributed fashion.

While the present general inventive concept has been particularly shown and described with reference to exemplary embodiments thereof, it will be understood by one of ordinary skill in the art that various changes in form and details may be made therein without departing from the spirit and scope of the present general inventive concept as defined by the following claims. The embodiments should be considered in descriptive sense only and not for purposes of limitation.

What is claimed is:

1. A method of issuing a new email account to a client device by a network device comprising an email server, the method comprising:
   registering an email account for an initial email in the email server, the email account to be used by the client device to send the initial email;
   receiving the initial email sent by the client device using the email account, the initial email being configured to trigger issuance of the new email account to the client device in response to the receipt of the initial email;
   reading information necessary for the issuance of the new email account from the initial email in response to the triggering of the issuance of the new email account to the client device;
   registering the new email account in the email server; and
   issuing the new email account to the client device,
   wherein, after the new email account is issued, the client device and the network device exchange data to be used to operate the network device via the new email account.

2. The method of claim 1, wherein the email account is a public use email account in which at least one identification for security is released for sending and receiving an email.

3. The method of claim 1, further comprising, before the receiving of the initial email, creating a preliminary email requesting the client device for information necessary for the issuance of the new email account, and sending the preliminary email to the client device via the email account, wherein the preliminary email comprises at least one among an email account issuance policy of the network device, a network address of the email server, and an email account management policy to be set in the client device.

4. The method of claim 3, wherein:
the email account issuance policy of the network device comprises at least one ID creation rule and at least one password creation rule, and
the email account management policy to be set in the client device comprises at least one form of an email to be used by the client device, at least one rule to access the email server and at least one release rule for the email server.

5. The method of claim 3, wherein the reading the information comprises reading an ID and a password that are created according to the email account issuance policy, and the registering the new email account comprises registering the ID and the password in the email server so that identification for security at the email server is performed based on the ID and the password.

6. The method of claim 1, further comprising:
creating an ID of the email account and registering the ID in the email server; and
outputting the ID of the email account and a network address of the email server to a user interface.

7. The method of claim 1, further comprising:
determining whether the initial email comprises the information necessary for the issuance of the new email account; and
if the initial email does not comprise the information necessary for the issuance of the new email account, outputting an error message via a user interface.

8. The method of claim 1, further comprising:
sending a push-type message to the client device notifying that the registration of the new email account has been completed,
wherein the push-type message comprises at least one of an ID and a password of the new email account.

9. The method of claim 1, wherein:
the network device is a T.37 gateway that sends to and receives from the client device an internet fax, which is sent and received via a TCP/IP network, and a telephone fax, which is sent and received via a phone network, by using the new email account, and
the client device is a T.37 device that sends to and receives from the network device the internet fax via the new email account.

10. A non-transitory computer-readable recording medium having embodied thereon a computer program for executing the method of claim 1.

11. A method of setting up a new email account for a client device from a network device comprising an email server, the method comprising:
receiving a first email from the network device via an email account, in which at least one identification for security of the email account is released for sending and receiving an email, among email accounts registered in the email server, the first email being configured to trigger the client device to send a second email to the email server in response to the receipt of the first email;
reading an email account issuance policy and a network address of the email server from the received first email in response to the triggering of the first email;
determining an ID and a password of the new email account, which is to be used by the client device, based on the read email account issuance policy; and
sending the second email to the network address of the email server via the email account, requesting issuance of the new email account according to the determined ID and the password,
wherein, after the new email account is issued, the client device uses the new email account to exchange data with the network device, the data being used to operate the network device via the new email account.

12. The method of claim 11, further comprising setting at least one form of an email to be used by the client device, at least one rule to access the emails server and at least one release rule for the new email account based on an email account management policy comprised in the received email.

13. The method of claim 11, further comprising setting the new email account as a basic email account of the client device based on the determined ID and the password.

14. A network device configured to issue a new email account to a client device, comprising:
an email server; and
a controller configured to:
register an email account for an initial email in the email server, the email account to be used by the client device to send the initial email;
receive the initial email sent by the client device using the email account, in which at least one identification for security of the first email account is released for sending and receiving an email among emails accounts registered in the email server, the initial email being configured to trigger issuance of the new email account to the client device in response to the receipt of the initial email;
read information necessary for the issuance of the new email account to be used by the client device from the received email in response to the triggering of the issuance of the new email account to the client device; and
register the new email account to be issued to the client device,
wherein, after the new email account is issued, the client device and the network device exchange data to be used to operate the network device via the new email account.

15. The network device of claim 14, wherein the controller sends at least one among:
an email account issuance policy of the network device, a network address of the email server, and
an email account management policy to be set in the client device and sent to the client device via the first email account.

16. The network device of claim 15, wherein the email account issuance policy of the network device comprises at least one ID creation rule and at least one password creation rule, and
the email account management policy to be set in the client device comprises at least one form of an email to be used by the client device, at least one rule to access the email server and at least one release rule for the email server.

17. The network device of claim 15, wherein the controller reads the information comprising an ID and a password that are created according to the email account issuance policy.

18. The network device of claim 14, wherein the controller
   creates an ID of the first email account and registers the ID in the email server, and
   outputs the ID of the first email account and the network address of the email server to a user interface.

19. The network device of claim 14, wherein the controller determines whether the received email comprises the information necessary for the issuance of the new email account, and outputs an error message via a user interface if the received email does not comprise the information necessary for the issuance of the new email account.

20. The network device of claim 14, wherein the controller sends a push-type message to the client device notifying that the registration of the new email account has been completed, and the push-type message comprises at least one of an ID and a password of the new email account.

21. A client device to which an email account is issued from a network device comprising an email server, the client device comprising:
   a controller configured to:
      receive a first email from the network device via an email account, in which at least one identification for security of the email account is released for sending and receiving an email, among email accounts registered in the email server, the first email being configured to trigger the client device to send a second email to the email server in response to the receipt of the first email,
      read an email account issuance policy and a network address of the email server from the received first email in response to the triggering of the first email, and
      determining an ID and a password of the new email account, which is to be issued by the client device, based on the read email account issuance policy; and
      send the second email requesting issuance of the new email account according to the determined ID and the password to the network address of the email server via the email account,
   wherein, after the new email account is issued, the client device uses the new email account to exchange data with the network device, the data being used to operate the network device via the new email account.

* * * * *